D. F. COMSTOCK.
COLOR PRINTING.
APPLICATION FILED JULY 31, 1916.
1,283,087.
Patented Oct. 29, 1918.
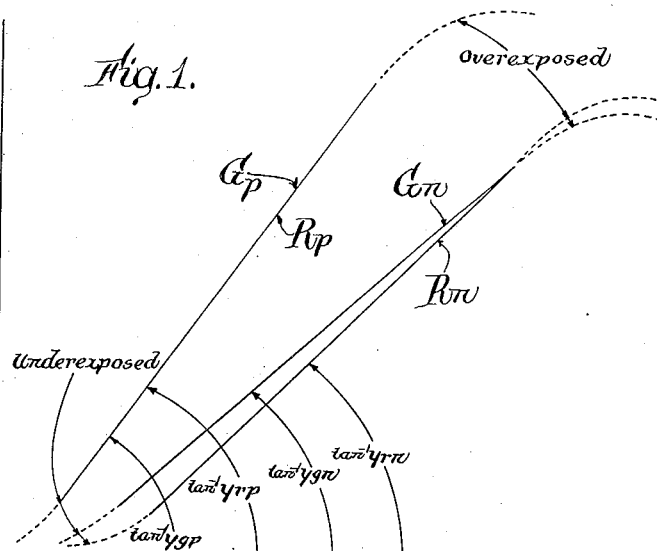
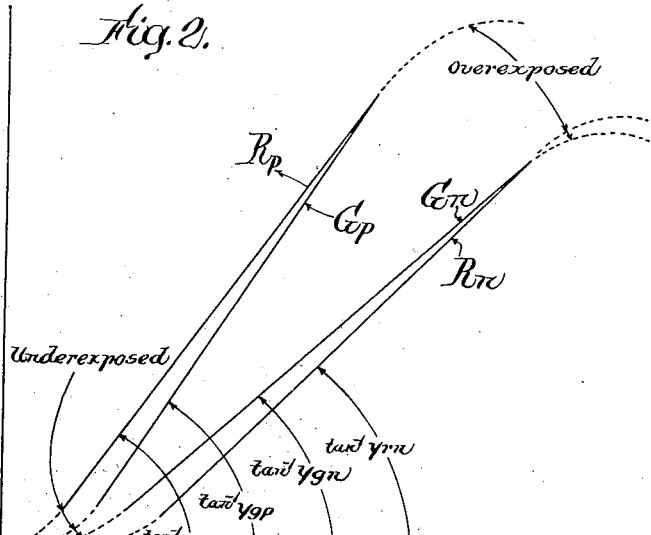
Inventor:
Daniel F. Comstock,
by Roberts Roberts & Cushman
Attys.

UNITED STATES PATENT OFFICE.

DANIEL F. COMSTOCK, OF BROOKLINE, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

COLOR-PRINTING.

1,283,087. Specification of Letters Patent. Patented Oct. 29, 1918.

Application filed July 31, 1916. Serial No. 112,378.

*To all whom it may concern:*

Be it known that I, DANIEL F. COMSTOCK, a citizen of the United States, and resident of Brookline, in the county of Norfolk and State of Massachusetts, have invented new and useful Improvements in Color-Printing, of which the following is a specification.

This invention relates to a process of producing positive images by the utilization of components of radiation having different ranges of wave lengths, and more particularly the invention relates to a process of producing from object fields having objects of one or more different colors, pictures having an accurate reproduction of the colors throughout the entire range of lights and shadows.

At present the invention is of particular value in the art of color motion picture photography where a multiplex picture film, comprising a plurality of series of negatives, is produced by making the exposures of the different series through different light filters respectively; producing a positive multiplex film by printing a plurality of series of positives from the series of negatives; and reproducing the original colored object fields by registering upon a screen images formed by projecting light through corresponding positives of the various series of positives and thence through color screens corresponding to the screens employed in exposing the respective series of negatives. Heretofore, in producing color pictures with certain types of film by this and similar processes it has been generally found that while fairly accurate reproduction of colors can be obtained for any one degree, or for any limited ranges of light intensity of the object field, accurate reproduction of colors can not be obtained throughout the entire range of light intensity and corresponding range of film densities when the plurality of series of negatives and positives, respectively, are on integral strips of film, the various series of which cannot practically be subjected to different degrees of development.

Thus the pictures projected on the screen may accurately reproduce the color values in the shadows, or in the high lights or at some intermediate light intensity, but they do not accurately reproduce the color values throughout the entire range of light intensities, that is, of lights and shadows, in the scene. This effect results in pictures the shadows of which are too highly colored with colors of the upper end of the spectrum, that is, colors corresponding to light of higher wave frequency, or the high lights of which are too highly colored with colors of the lower end of the spectrum, that is, colors corresponding to light of lower wave frequency, or both the shadows and the high lights of which appear too highly colored with colors of this opposite character. For example, with the two color process, employing red and green filters, the pictures appear either too green in the shadows or too red in the high lights, or both.

This disproportionate reproduction of the color values is due to the fact that components of light of different wave lengths produce different effects upon a photographic emulsion, the different effects consisting in that the difference in density between the shadows and the high lights in the negatives produced by components of light of greater wave length is greater than the difference in density between the shadows and the high lights in the negatives produced by components of light of lesser wave length. In other words, the contrast, or range of densities, throughout the respective negatives produced by light of greater wave length is greater than the contrast, or range of densities, throughout the respective negatives produced by light of lesser wave length. For example, negatives produced by red components of light have a greater degree of contrast than negatives produced by green components of light, that is, the contrast gradients of the two negatives are disproportionate, the gradient of the red negatives being steeper than the gradient of the green negatives.

Now the different series of positive images, when printed from the negative images in the ordinary way, have correspondingly different degrees of contact. In the case of two series of negatives respectively produced by red and green light, for example, if the two series are exposed to such a relative degree that they have, with relation to each other, proper densities in the high lights or dense portions, the series exposed with green light will be too dense in the shadows or less dense portions with relation to the density in the shadows of the series exposed with red light; and the positives will bear the opposite relation to each other, namely, if the two series of positives are printed to such a degree that they have, with relation to each other, proper densities in the high lights or less dense portions, the green series will not be sufficiently dense in the shadows or dense portions with relation to the density in the shadows of the red series, inasmuch as the negatives from which the green positives are printed are too dense in the shadows. That is, the red negatives are not sufficiently dense in the shadows resulting in red positives too dense in the shadows, and the converse is true of the green negatives and positives. And owing to the fact that the green positives are relatively not sufficiently dense in the shadows, the pictures produced on a screen by projecting light through the positives will therefore be too green in the shadows with relation to the green in the high lights, or the pictures will be too red in high lights, or both, depending upon whether the process is regulated to give accurate color reproduction in the high lights, or in the shadows, or at some intermediate light value.

If, to take the simplest possible case as an example, a plurality of photographs of a snow scene in sunlight, be respectively taken through red and green filters of such nature that the light transmitted by each filter has substantially the same actinic value, the two photographs would be almost identical. But due to the different range of wave lengths, or different dominant hues, of the two components of the light, the two negatives will not be identical but will show a characteristic difference exactly similar to that which would be produced by developing two identical negatives a slightly different amount. Thus, from the standpoint of subsequent projection in registry upon the screen, through positives printed from the negatives in the ordinary way, the photographs form a defective system resulting in pictures which are too green in the shadows, too red in the high lights, or both.

If the negatives exposed with green light, having the lesser contrast gradient, could be subjected to a slightly greater degree of development than the negatives exposed with red light, having the greater contrast gradient, the defect could be eliminated; but in the case of multiplex motion picture films, where the respective series of pictures are juxtaposed on an integral strip, this is practically impossible. In the present invention the same wave-length phenomenon which caused the defect in the negatives is used to avoid the defect in the positives. Since it is not practicable to develop the positives (or negatives) to different degrees, I employ a method giving the same result, namely, I print the positives with components of light of different ranges of waves length, that is of different dominant hues. Theoretically these components could be of the same dominant hues (oppositely applied) as the components employed in exposing the negatives, but since the ordinary positive is very insensitive to red light, this is not practicable. But inasmuch as the generic principle merely requires that there be a proper difference of dominant hue between the respective components, colors other than the exposing colors give effective results, and when employing red and green filters in taking the picture blue and ultra-violet filters give satisfactory results in printing the positives, the blue filter being employed with the green sensation negatives and the ultra-violet filter being employed with the red sensation negatives.

Thus, the preferred form of my improved method of producing accurate color pictures, or of producing positives from which accurate pictures may be obtained, comprises printing the positives from the negatives in such a manner as to reverse or neutralize the disproportionate contrast gradients in the respective color series of negatives. I employ components of light of wave-length differing respectively in converse order to the order of the respective components employed in exposing the negatives, whereby the disproportion in the respective gradients of the negatives is corrected in the positives by reversing the order of the components of light employed. For printing positives from negatives having a high contrast gradient due to the color component of light employed in exposing the negative, I employ light of such wave length that it will tend to produce a positive having a comparatively low contrast gradient, and for printing positives from negatives having a low contrast gradient I employ light of such wave length that it will tend to produce a positive having a comparatively high contrast gradient.

The principal object of my invention, therefore, is to provide a method of producing color pictures which have accurate color values throughout the entire range of lights and shadows, whereby pictures of an object field may be produced in which the various colors of the objects may be accurately reproduced although the object field has a wide range of light values and a wide range of color values.

In the accompanying drawings,—

Figure 1 comprises two pairs of curves, one set showing the relation between the densities of red and green negatives, respectively, and the logarithms of the actinic value of the light throughout the object field, and the other set showing the relation between the densities of red and green positives printed from the red and green negatives, respectively, and the logarithms of the actinic value of the light incident to the various portions of the positives in printing; and Fig. 2 comprises two pairs of curves showing similar relations pertaining to the densities of negatives and positives produced in accordance with my invention.

When a photographic negative is exposed to an object field containing a wide range of light values, that is, a wide range of different degrees of brightness comprising high lights and shadows, and intermediate degrees of brightness, and when the negative is then properly developed, the densities of the deposit throughout the negative varies in the same order as the light values throughout the object field. If the densities be plotted as ordinates against the logarithms of the corresponding actinic intensities as abscissæ, a curve will be obtained of the form illustrated by any one of the curves shown in the drawings, the substantially straight portions of which corresponds to a range of exposures which will give an accurate reproduction of the relative light values of the object field and the upper and lower curved portions of which correspond to overexposures and underexposures respectively, in which the light values of the field are not accurately reproduced.

The slope of the straight portion of the exposure curve, namely, the tangent of the angle which the straight portion makes with the axis of abscissæ, commonly called the development factor and commonly designated by the Greek letter gamma ($\gamma$), represents the degree of contrast in the film as compared with the degree of contrast in the object field and is of great theoretical and practical importance. For any given film the slope is determined largely by the degree of development and is totally independent of the degree of exposure. Thus, by increasing the amount of development the slope of the curve is increased, but by increasing the amount of exposure the slope remains unchanged, the only effect being to shift the curve laterally as by adding a constant factor to each abscissa.

In printing and developing positives the same laws apply as above outlined in connection with the exposure and development of negatives, the positive curve having an independent slope depending upon the degree of development to which it is subjected. To obtain accurate proportionate reproduction in the positive of the light values in the object field, the positive gamma and the negative gamma must be so determined by the proper relative degrees of development of the negative and the positive that their product is substantially equal to unity.

In Fig. 1, $R_n$ represents the exposure curve of the negatives exposed with red components of light, which I shall call the red negatives, and the slope of the straight portion of this curve is indicated as the angle whose tangent is $\gamma_{rn}$; $G_n$ represents the exposure curve of the negatives exposed with green components of light, which I shall call the green negatives, and the slope of the straight portion of this curve is indicated as the angle whose tangent is $\gamma_{gn}$. It will be noted that the slope of the red negative curve $R_n$ is greater than the slope of the green negative curve $G_n$, resulting in greater densities in the lower portion of the green negative curve than in the lower portion of the red negative curve. $R_p$ and $G_p$ are the positive curves respectively printed from the red and green negatives, which I shall call the red and green positives, and inasmuch as they are each printed with white light, as has heretofore been the practice, and are subjected to the same development, the slopes of the two curves $\tan^{-1}\gamma_{gp}$ and $\tan^{-1}\gamma_{rp}$ are equal and the two curves are coincident. However, the absolute density gradients of the positives as compared with the color values of the object field are not the same but differ from each other in a way corresponding to the difference between the negatives. That is, the green positives are not sufficiently dense in the shadows due to the green negatives being too dense in the shadows and the red positives are too dense in the shadows due to the red negatives being insufficiently dense in the shadows. The closest approximation to an accurate reproduction of the color values in the pictures, with this process, is obtained by regulating the amounts of development of the negatives and positives, respectively, so that the product of the average gamma of the negatives with the gamma of the positives is equal to unity.

The principal result of my invention is illustrated in Fig. 2, wherein the reference characters have the same significance as in Fig. 1. The red negative curve $R_n$ and the green negative curve $G_n$ bear the same relation to each other as in Fig. 1, but owing to the fact that instead of white light different color components of light are employed in printing the respective positives, the red positive curve $R_p$ has a slope $\gamma_{rp}$ different from the slope $\gamma_{gp}$ of the green positive, and, owing to the fact that a component of light is employed in printing the green positive having a wave length greater than the wave length of the component of light employed in printing the red positive, the slope of the green positive gradient $\gamma_{gp}$ is greater than the slope of the red positive gradiant $\gamma_{rp}$. The difference between $\gamma_{gp}$ and $\gamma_{rp}$ can readily be varied by varying the difference between the dominant hues of the components of light employed in printing the respective positives. Thus, inasmuch as $\gamma_{gp}$ is greater than $\gamma_{rp}$, and $\gamma_{gn}$ is less than $\gamma_{rn}$, and inasmuch as the values of $\gamma_{gp}$ and $\gamma_{gn}$ can be readily controlled in printing by employing components of light having the proper dominant hue, it obviously follows that $\gamma_{gp}$ and $\gamma_{rp}$ can be so determined that the product of $\gamma_{gp}$ and $\gamma_{gn}$ is equal to the product of $\gamma_{rp}$ and $\gamma_{rn}$ and, if desired, so that these products are each substantially equal to unity, under which condition the color values of the field are accurately reproduced in the projected pictures throughout the entire range of lights and shadows.

While I have described my invention as applied to a two-color process, it is obvious that it may be applied to a process comprising any desired number of colors; and while I have described it in connection with the motion picture art it is equally applicable to the art of projecting stationary color pictures upon a screen or in progressively printing pictures by means of a succession of negatives with a succession of components of light of different color.

I claim:—

1. The method of producing color pictures comprising respectively producing a plurality of complemental negatives with different color components of light from the object field and respectively printing complemental positives from the negatives with color components of light differing with respect to each other.

2. The method of producing color pictures by means of a multiplex picture strips comprising respectively exposing a plurality of negatives on the strip with components of light from the object field having different dominant hues and respectively printing positives from the negatives with components of light having different dominant hues.

3. The method of producing color pictures by means of multiplex picture strips comprising exposing corresponding negatives of the multiplex negative strip with components of light from the object field having a certain difference in dominant hue and respectively printing positives from the negatives with components of light having the same effective difference in hue.

4. The method of producing color pictures by means of multiplex picture strips, comprising respectively exposing corresponding negatives of the negative strip with components of light differing in dominant hue, and respectively printing upon the positive strip positives from the negatives with components of light differing in dominant hue in the same effective degree but in converse order with relation to the corresponding negative components.

5. The method of producing color pictures by means of integral multiplex picture strips comprising respectively exposing corresponding negatives on the negative strip with components of light having different dominant hues, and respectively printing upon the positive strip positives from the negatives with components of light which have effectively the same respective hues but which are applied in converse order with relation to the order of application of the corresponding negative components.

6. The method of producing color pictures by means of integral multiplex picture strips comprising respectively exposing corresponding negatives on the negative strip through light filters having dominant hues differing from each other, and respectively printing upon the positive strip positives from the negatives through light filters having dominant hues differing from each other in similar effective degree but in converse order with relation to the negative filters.

7. The method of producing pictures by means of integral multiplex picture strips comprising respectively exposing corresponding negatives on the negative strip with components of light having dominant hues differing from each other, respectively developing the negatives an amount corresponding to certain development factors, respectively printing upon the positive strip positives from the negatives with components of light having dominant hues differing from each other in similar effective degree but in converse order with relation to the negative hues, and developing the positives an amount corresponding to certain development factors, whereby the product of the development factors of corresponding positives and negatives may be made equal.

8. The method of producing color pictures by means of integral multiplex picture strips comprising respectively exposing corresponding negatives on the negative strip through filters having dominant hues differing from each other, developing the negatives an amount corresponding to certain development factors, respectively printing upon the positive strip positives from the negatives through filters having dominant hues differing from each other in similar effective degree but in converse order with relation to the negative filters, respectively developing the positives an amount corresponding to certain development factors, the products of which with the corresponding negative development factors are respectively equal, and from the respective positives projecting images in superposed relation to each other through filters corresponding to the negative filters having dominant hues differing from each other in similar effective degree but in converse order with relation to the positive filters.

9. The method of producing color pictures by means of integral multiplex picture strips comprising respectively exposing corresponding negatives on the negative strip through filters having dominant hues differing from each other, respectively printing on the positive strip positives from the negatives through filters having dominant hues differing from each other in similar effective degree but in converse order with relation to the negative filters, and from the respective positives projecting images in superposed relation to each other through filters corresponding to the negative filters having dominant hues differing from each other in similar effective degree but in converse order with relation to the positive filters.

Signed by me at Boston, Massachusetts, this 27th day of July 1916.

DANIEL F. COMSTOCK.